(12) United States Patent
Liu et al.

(10) Patent No.: US 11,338,919 B2
(45) Date of Patent: May 24, 2022

(54) GIMBAL, FRAME, AND UNMANNED AERIAL VEHICLE

(71) Applicant: SZ DJI TECHNOLOGY CO., LTD., Shenzhen (CN)

(72) Inventors: Yucheng Liu, Shenzhen (CN); Li Qiu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/031,455

(22) Filed: Sep. 24, 2020

(65) Prior Publication Data

US 2021/0016882 A1 Jan. 21, 2021

Related U.S. Application Data

(63) Continuation of application No. PCT/CN2018/084524, filed on Apr. 25, 2018.

(51) Int. Cl.
*F16M 11/12* (2006.01)
*F16M 11/18* (2006.01)
(Continued)

(52) U.S. Cl.
CPC ............ *B64C 39/024* (2013.01); *B64D 41/00* (2013.01); *B64D 47/08* (2013.01); *F16M 11/123* (2013.01);
(Continued)

(58) Field of Classification Search
CPC .. G03B 15/006; G03B 17/561; F16M 11/123; F16M 11/18
See application file for complete search history.

(56) References Cited

U.S. PATENT DOCUMENTS

| 7,955,006 B1 | 6/2011 | Harvey |
| 2012/0316685 A1 | 12/2012 | Pettersson |

(Continued)

FOREIGN PATENT DOCUMENTS

| CN | 204647758 U | 9/2015 |
| CN | 205105029 U | 3/2016 |

(Continued)

OTHER PUBLICATIONS

The World Intellectual Property Organization (WIPO) International Search Report for PCT/CN2018/084524 dated Jan. 30, 2019 8 pages.

*Primary Examiner* — Minh Q Phan
(74) *Attorney, Agent, or Firm* — Anova Law Group, PLLC (57) ABSTRACT

Embodiments of the present disclosure provides a gimbal. The gimbal includes a pitch motor, a coaxial cable, and a first support arm arranged opposite a second support arm. The pitch motor is disposed at a front end of the first support arm, a motor shaft of the pitch motor extending in a direction of the second support arm for connecting with one end of an imaging device; a limiting shaft is disposed at a front end of the second support arm, the limiting shaft extending in a direction of the first arm for connecting with another end of the imaging device; a first wiring space is formed in the limiting shaft and a second wiring space is formed in the second support arm, a first end of the coaxial cable sequentially passing through the second wiring space and the first wiring space for electrically connecting with the imaging device.

19 Claims, 8 Drawing Sheets

(51) Int. Cl.
*G03B 17/56* (2021.01)
*B64C 39/02* (2006.01)
*B64D 41/00* (2006.01)
*B64D 47/08* (2006.01)
*G03B 15/00* (2021.01)

(52) U.S. Cl.
CPC ........... *F16M 11/18* (2013.01); *G03B 15/006* (2013.01); *G03B 17/561* (2013.01); *B64C 2201/027* (2013.01); *B64C 2201/127* (2013.01)

(56) References Cited

U.S. PATENT DOCUMENTS

| | | | | |
|---|---|---|---|---|
| 2015/0097950 A1* | 4/2015 | Wang | ................ | H04N 5/23287 |
| | | | | 348/144 |
| 2017/0227831 A1* | 8/2017 | Tang | .................... | G03B 15/006 |
| 2018/0003340 A1* | 1/2018 | Tian | ......................... | H02K 7/14 |
| 2018/0138684 A1* | 5/2018 | Tian | ....................... | B64D 47/08 |
| 2018/0299750 A1* | 10/2018 | Vuillet | ................... | F16B 21/02 |
| 2020/0371310 A1* | 11/2020 | Yu | .......................... | B64D 47/08 |

FOREIGN PATENT DOCUMENTS

| | | |
|---|---|---|
| CN | 205320423 U | 6/2016 |
| CN | 205366095 U | 7/2016 |
| CN | 105864606 A | 8/2016 |
| CN | 205560201 U | 9/2016 |
| CN | 105992903 A | 10/2016 |
| CN | 106477058 A | 3/2017 |
| CN | 206107592 U | 4/2017 |
| CN | 106715269 A | 5/2017 |
| CN | 107065403 A | 8/2017 |

* cited by examiner

GIMBAL, FRAME, AND UNMANNED AERIAL VEHICLE

CROSS-REFERENCE TO RELATED APPLICATION

This application is a continuation of International Application No. PCT/CN2018/084524, filed on Apr. 25, 2018, the entire content of which is incorporated herein by reference.

TECHNICAL FIELD

The present disclosure relates to the field of unmanned aerial vehicle (UAV) technology and, more specifically, to a gimbal, a frame, and a UAV.

BACKGROUND

The gimbal mounted on a UAV is often a three-axis stabilization gimbal (hereinafter referred to as a three-axis gimbal). The three-axis gimbal is a device for achieving stable control of a target object's attitude. In other words, the object can keep its attitude unchanged during movement. Taking a camera being mounted on the three-axis gimbal as an example, the camera can still capture a smooth image during movement. Three motors are distributed on a support arm of the stabilization gimbal, which are used to control the rotation of the yaw axis, roll axis, and the pitch axis. In addition, in order to control the parameters of the camera (such as aperture, sensitivity, focal length, etc.), it is necessary to use a wire to electrically connect the camera and a flight control system. However, if the connecting wire is disposed outside the gimbal, it will affect the appearance of the UAV, and the connecting wire will easily interfere with other objects. If the connecting wire is disposed inside the gimbal, it is necessary to punch holes on the side of the gimbal to avoid the motors installed on the gimbal, which will reduce the dustproof performance of the gimbal.

SUMMARY

Embodiments of the present disclosure provides a gimbal. The gimbal includes a pitch motor; a coaxial cable; and a first support arm arranged opposite a second support arm. The pitch motor is disposed at a front end of the first support arm, a motor shaft of the pitch motor extending in a direction of the second support arm for detachably connecting with one end of an imaging device; a limiting shaft is disposed at a front end of the second support arm, the limiting shaft extending in a direction of the first arm for detachably connecting with another end of the imaging device; a first wiring space is formed in the limiting shaft and a second wiring space connected to the first wiring space is formed in the second support arm, a first end of the coaxial cable sequentially passing through the second wiring space and the first wiring space for electrically connecting with the imaging device.

Embodiments of the present disclosure provides a UAV frame. The UAV frame includes a center frame and a gimbal. The gimbal includes a pitch motor; a coaxial cable; and a first support arm arranged opposite a second support arm. The pitch motor is disposed at a front end of the first support arm, a motor shaft of the pitch motor extending in a direction of the second support arm for detachably connecting with one end of an imaging device; a limiting shaft is disposed at a front end of the second support arm, the limiting shaft extending in a direction of the first arm for detachably connecting with another end of the imaging device; a first wiring space is formed in the limiting shaft and a second wiring space connected to the first wiring space is formed in the second support arm, a first end of the coaxial cable sequentially passing through the second wiring space and the first wiring space for electrically connecting with the imaging device; a rear end of the first support arm and a rear end of the second support arm are rotatably connected below the center frame.

Embodiments of the present disclosure provides a UAV. The UAV includes a frame, which includes a center frame and a gimbal. The UAV further includes an arm and a power assembly being connected to the center frame of the frame through the arm. The gimbal includes a pitch motor; a coaxial cable; and a first support arm arranged opposite a second support arm. The pitch motor is disposed at a front end of the first support arm, a motor shaft of the pitch motor extending in a direction of the second support arm for detachably connecting with one end of an imaging device; a limiting shaft is disposed at a front end of the second support arm, the limiting shaft extending in a direction of the first arm for detachably connecting with another end of the imaging device; a first wiring space is formed in the limiting shaft and a second wiring space connected to the first wiring space is formed in the second support arm, a first end of the coaxial cable sequentially passing through the second wiring space and the first wiring space for electrically connecting with the imaging device; a rear end of the first support arm and a rear end of the second support arm are rotatably connected below the center frame.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

REFERENCE NUMERALS

1 UAV
11 Center frame
13 Arm
15 Power assembly
17 Landing gear
3 Gimbal
31 Right support arm
311 First motor cover
32 Pitch motor
33 Left support arm
331 Left housing
332 Second wiring space
333 Right housing
334 Decorative cover
335 Dust cover
336 Third wiring space
337 Support part
339 Bearing
34 Limiting shaft
341 First wiring space
35 Upper support arm
351 First cover plate
3511 Shielding part
3513 Upper part
3515 Reinforcing ribs
352 Fourth wiring space
353 Second cover plate
354 Fifth wiring space
355 Second motor cover
357 Third motor cover
359 Protective cover
36 Roll motor
37 Yaw motor
38 Battery
39 Quick release connector
5 Camera
7 Coaxial cable

DETAILED DESCRIPTION OF THE EMBODIMENTS

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

In the present disclosure, when terms such as "center," "longitudinal," "lateral," "length," "width," "thickness," "above," "upper," "below," "lower," "back," "left," "right," "vertical," "horizontal," "top," "bottom," "inside," "outside," "internal," "external," "clockwise," "counter-clockwise" are used to indicate orientational or positional relationship that is based on the orientation or positional relationship as shown in the drawings, it is for the convenience of describing various embodiments and for the simplification of the descriptions. Such terms do not indicate or imply a related device or element necessarily has the specified orientation, or is structurally configured in the specified orientation or is operated in the specified orientation. Thus, these terms are for illustrative purposes only and are not intended to limit the scope of the present disclosure.

It should be understood that in the present disclosure, relational terms such as first and second, etc., are only used to distinguish an entity or operation from another entity or operation, and do not necessarily imply that there is an actual relationship or order between the entities or operations. Therefore, a "first" or "second" feature may include, explicitly or implicitly, one or more such features. The term "multiple" means two or more than two, unless otherwise defined.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements or interactions of two elements, which can be understood by those skilled in the art according to specific situations.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. Moreover, those skilled in the art could combine different embodiments or different characteristics in embodiments or examples described in the present disclosure. In addition, when there is no conflict, those skilled in the art may combine different embodiments, or examples and features of different embodiments, or examples described in the present disclosure.

Figure 1:
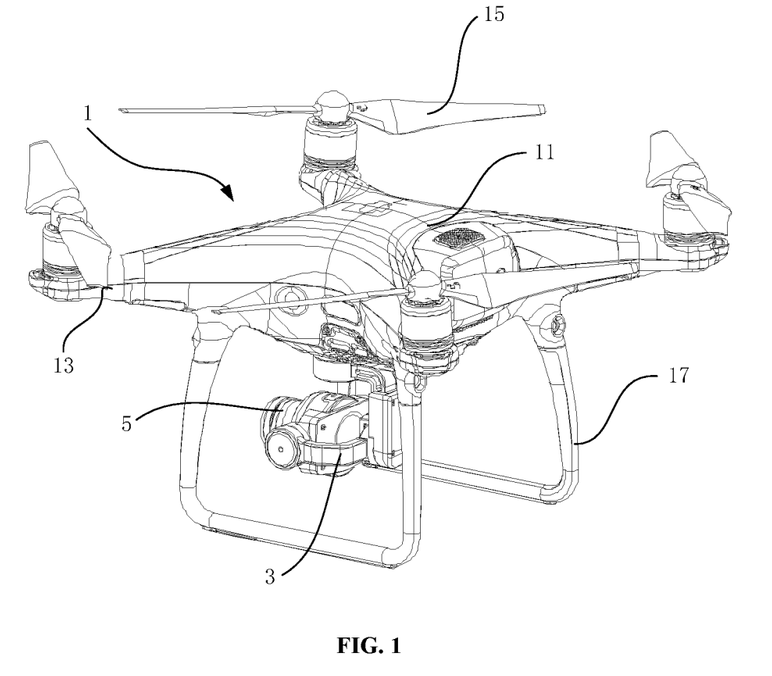
FIG. 1 is a structural diagram of a UAV according to an embodiment of the present disclosure.

FIG. 1 is a structural diagram of a UAV according to an embodiment of the present disclosure. As shown in FIG. 1, a UAV 1 includes a frame, an arm 13, and a power assembly 15. The frame includes a center frame 11 as a main part of the UAV 1 and a gimbal 3 mounted below the center frame 11.

More specifically, the center frame 11 includes a top surface facing the sky, a bottom surface facing the ground, and side surfaces between the top surface and the bottom surface. The top, bottom, and side surfaces are connected together to form a box-like body resembling a rectangle, a rhombus (as shown in FIG. 1), and other regular or irregular shapes. A flight control system for controlling the flight state of the UAV 1 and a battery for providing electrical energy for the flight control system and the power assembly 15 can be disposed in the receiving space surrounded by the top, bottom, and sides surfaces. In the embodiments of the present disclosure the flight control system can be a microprocessor, microcontroller, integrated circuit, etc. The flight control system can be used to control various attitude of the UAV 1, including ascent, landing, turning, hovering, etc. The battery may be a lithium battery, a smart battery, a dry battery, or other suitable batteries.

Although the battery is disposed in the receiving space of the center frame 11 in this embodiment, in some other embodiments, the battery may also be disposed in a mounting cavity formed by a recessed bottom surface of the center frame 11, or the battery may also be disposed at a suitable position outside the center frame 11 through an external component. In some embodiments, if the mounting cavity is formed on the bottom surface of the center frame 11 to mount the battery, a detachable battery cover may be provided for the mounting cavity to prevent the battery from being exposed to the environment, thereby reducing the risk of damage to the battery 38 or short circuit.

The arm 13 may be one arm or a plurality of arms. For example, when the UAV 1 only include one arm 13, the arm 13 may be mounted in the center of the center frame 11, and the power assembly 15 may be mounted on top of the arm 13, thereby forming an unmanned helicopter. In another example, when the UAV 1 includes a plurality of arms 13, these arms 13 may be evenly arranged around the center frame 11 to form a radial arrangement around the center frame 11. Of course, the embodiment of the present disclosure does not exclude the situation that a plurality of arms 13 are arranged non-uniformly around the center frame 11.

Taking a plurality of arms 13 are evenly arranged around the center frame 11 as an example. These arms 13 can be symmetrically arranged with respect to any one or more center lines of the center frame 11, for example, the plurality of arms 13 may be arranged symmetrically about the longitudinal axis or the horizontal axis of the center frame 11. FIG. 1 illustrates a UAV 1 with four arms 13 evenly arranged around the center frame 11 and symmetrically about the horizontal axis and the vertical axis of the center frame 11.

In order to reduce the weight of the UAV 1 and improve the flight dynamics of the UAV 1, the arm 13 can be made of carbon fiber material into a hollow structure, such as a hollow rod. Of course, the embodiment also does not exclude the use of other materials (such as magnesium aluminum alloy or plastic) to make the arm 13 into a solid or hollow plate or frame shapes.

During installation, the arm 13 may be fixedly connected to the center frame 11, or rotatably connected to the center frame 11. Alternatively, the arm 13 may be designed to be foldable relative to the center frame 11 to reduce the space occupied by the UAV 1 in the storage state. Of course, in order to improve the overall structural strength of the UAV 1, the arm 13 of the UAV 1 can also be integrally formed with the center frame 11, or the center frame 11 can be appropriately extended toward the arm 13 to reduce the length of the arm 13.

The power assembly 15 can be mounted at the end of the arm 13 away from the center frame 11 to provide power for the ascent, forward, hover, and rotation of the UAV 1. The power assembly 15 may include a propeller, a driving motor that drives the propeller to rotate, and an electronic regular that controls the working parameters of the driving motor. In order to improve the flight power of the UAV 1, in this embodiment, a plurality of power assemblies 15 can be disposed on one arm 13. The plurality of power assemblies 15 may be arranged on one arm 13 at intervals along the extension direction of the arm 13, or can be arranged above or below one arm 13 at the same time. For example, two power assemblies 15 that are symmetrically in the vertical direction may be disposed at the end of the same arm 13 away from the center frame 11.

A plurality of landing gears 17 may also be disposed below the center frame 10 to support the UAV 1 when the UAV 1 lands on the ground or other ground fixed objects, thereby preventing the main structures, such as the center frame 11 of the UAV 1 from contacting the ground or ground fixed objects to protect the UAV 1. Generally, the landing gear 17 may be made of carbon fiber material into a hollow rod-like structure to reduce the weight and improve the power performance of the UAV 1. Of course, the embodiments of the present disclosure do not exclude the use of other lightweight, high-strength, or other material to make the landing gear 17.

Similarly, in this embodiment, the gimbal 3 can also be mounted on the center frame 11 in a detachable or non-detachable manner. For example, a quick release connector may be disposed on the gimbal 3 as described below, and a quick release interface may be disposed on the bottom surface or the side surface of the center frame 11, such that the quick release connector can be quickly mounted or removed from the quick release interface. In some embodiments, a plug and a socket, such as a pin jack plug and socket, for communication connection or power supply can also be disposed on the quick release connector and the quick release interface. As such, the flight control system in the center frame 11 may realize the communication connection with the gimbal 3 or power supply for the operation of the gimbal 3 through the quick release connector and the quick release interface that cooperate with each other. Of course, if a battery is disposed on the gimbal 3, the gimbal 3 can also supply power for the flight control system or power assembly 15. It should be understood that, in some other embodiments, the quick release connector may be disposed on the bottom surface or the side surface of the center frame 11, and the quick release interface may be disposed on the gimbal 3.

An imaging device, such as a visual imaging device including an image capturing device and a camera 5, an infrared imaging device, an ultraviolet imaging device, and a thermal imaging device, can be carried by the gimbal 3. In order to realize the single transmission with the imaging device, a connecting wire needs to be used to electrically connect the motor and the flight control system in the center frame 11. In this embodiment, by improving the structure of the gimbal 3, that number and the size of openings on the gimbal can be reduced, such that the connecting wire for connecting the flight control system and the imaging device can be positioned inside the gimbal 3, thereby reducing the erosion of the gimbal 3 by dust, rain, or snow, and improving the stability and service life of the gimbal 3.

Figure 2:
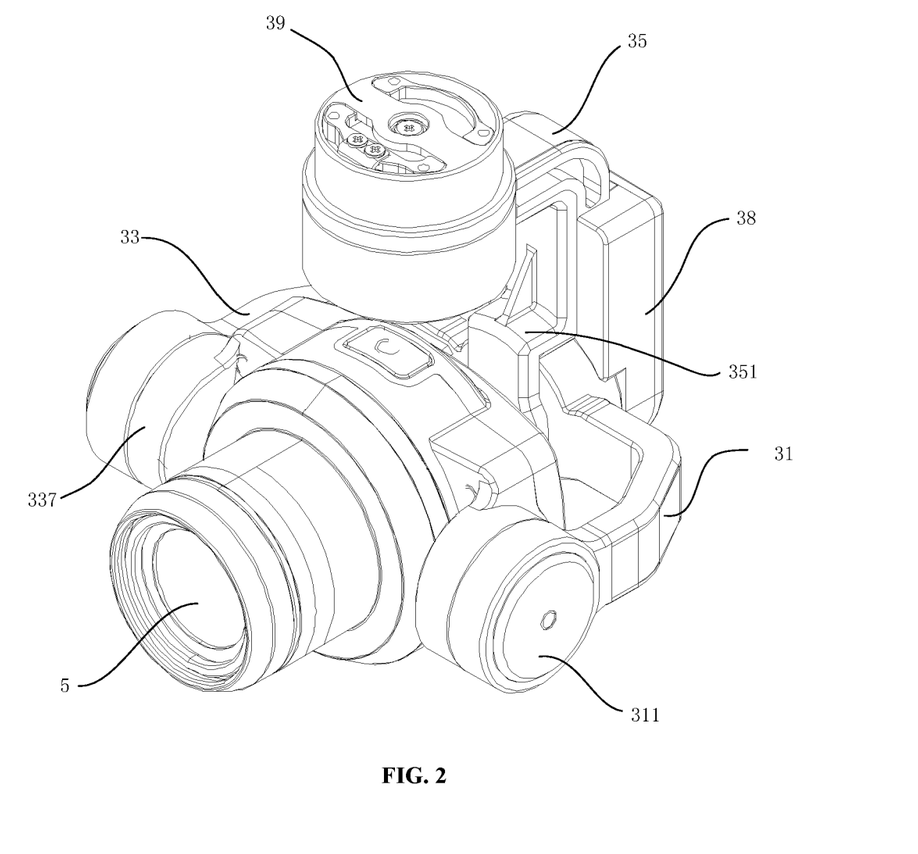
FIG. 2 is a structural diagram of a gimbal shown in FIG. 1 carrying a camera.
Figure 3:
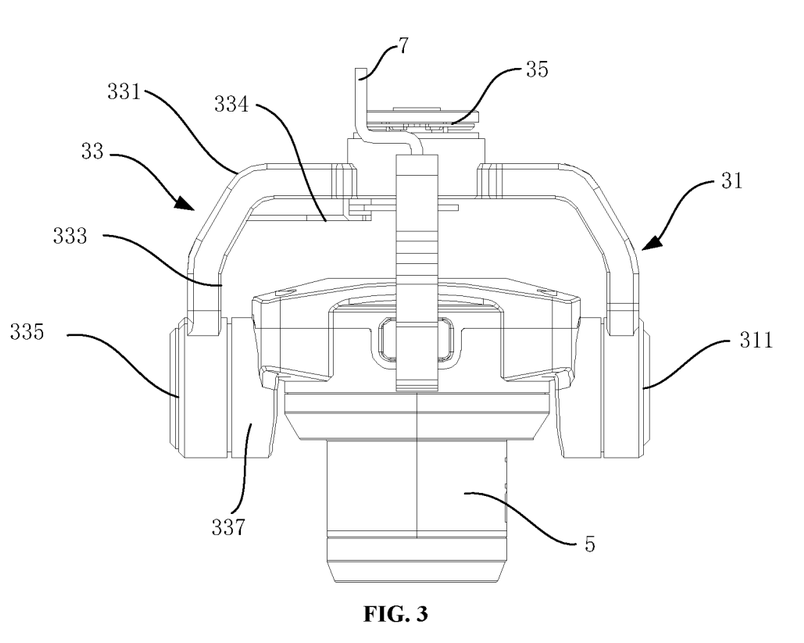
FIG. 3 is a top view of FIG. 2. To better illustrate the overall connection between the gimbal and the camera, the quick release connector, upper arm, and battery of the gimbal are omitted, and only the coaxial cable is exposed.

FIG. 2 is a structural diagram of a gimbal carrying a camera, and FIG. 3 is a top view of FIG. 2. As shown in FIGS. 2 and 3, the gimbal 3 includes a first arm on the right (hereinafter referred to as a right support arm 31), a second arm on the left ((hereinafter referred to as a left support arm 33), and a third arm on the upper side ((hereinafter referred to as an upper support arm 35). In particular, the left support arm 33 and the right support arm 31 are arranged opposite to each other, the rear end of the left support arm 33 is bent toward the right support arm 31, and the rear end of the right support arm 31 is bent toward the left support arm 33, such that the left support arm 33 and the right support arm 31 form an mounting space for mounting the camera 5. In this embodiment, the right support arm 31 and the left support arm 33 may be two separate parts, or they may be an integral piece. When the right support arm 31 and left support arm 33 are two separate parts, the rear ends of the two may be fixedly connected together.

The bottom of the upper support arm 35 is connected with the rear end of the left support arm 33 and the rear end of the right support arm 31, and the top of the upper support arm 35 is connected with the bottom surface of the center frame 11. Since in this embodiment, the upper support arm 35 serves to connect the center frame 11 with the right support arm 31 and the left support arm 33, therefore, the upper support arm 35 can be perpendicular to the right support arm 31 and the left support arm 33, and extend upward to the center frame 11. Of course, in some other embodiments, the upper support arm 35 can also be inclined to the right support arm 31 and the left support arm 33. Further, a third arm that is inclined or perpendicular to the right support arm 31 and the left support arm 33 and extend downward may be provided. In this case, the third arm may be referred to as a lower support arm.

The following description takes the upper support arm 35 being perpendicular to the right support arm 31 and the left support arm 33 shown in FIG. 2 as an example to introduce a connection relationship between the upper support arm 35, the center frame 11, the right support arm 31, and the left support arm 33.

In some embodiments, the top of the upper support arm 35 may be fixedly connected to the bottom surface of the center frame 11, and the bottom of the upper support arm 35 may also be fixedly connected to the rear ends of the right support arm 31 and the left support arm 33. In addition, a pitch motor 32 may be mounted at the front end of the right support arm 31, thereby forming a pitch axis gimbal. Of course, in this embodiment, the upper support arm 35 may not be disposed on the gimbal 3. Instead, at least one or the right support arm 31 and the left support arm 33 may be directly connected with the center frame 11. In some embodiments, in some implementation of this example, if the top of the upper support arm 35 is rotatably connected to the bottom surface of the center frame 11, a dual-axis gimbal capable of rotating about the pitch axis and the roll axis, or about the pitch axis and the yaw axis may be formed.

In other embodiments, the top of the upper support arm 35 may be fixedly connected to the bottom surface of the center frame 11, and the bottom of the upper support arm 35 may be rotatably connected to the rear ends of the right support arm 31 and the upper support arm 35. In addition, the pitch motor 32 may be mounted at the front end of the right support arm 31, thereby forming a dual-axis gimbal capable of rotating about the pitch axis and the roll axis. Of course, in this embodiment, the upper support arm 35 may not be provided. Instead, the rear ends of the right support arm 31 and the left support arm 33 may be rotatably connected to form a dual-axis gimbal capable of rotating about the pitch axis and the roll axis. In some embodiments, if the top of the upper support arm 35 is rotatably connected with the bottom surface of the center frame 11, then a three-axis gimbal capable of rotating about the pitch axis, the roll axis, and the yaw axis may be formed. More specifically, the pitch motor 32 can be mounted at the front end of the right support arm 31, a roll motor 36 can be mounted at the bottom of the upper support arm 35, and a yaw motor 37 can be mounted on top of the upper support arm 35. As such, a three-axis gimbal 3 can drive a payload being carried thereon to move in a three-dimensional space under the cooperation of the pitch motor 32, the roll motor 36, and the yaw motor 37.

In this embodiment, the motor shaft of the pitch motor 32 at the front end of the right support arm 31 may extend toward the left support arm 33, such that it may be detachably connected to one end of the camera 5.

A limiting shaft 34 can be mounted at the front end of the left support arm 33. The limiting shaft 34 may extend toward the right support arm 31, such that it may be detachably connected to the other end of the imaging device. As such, when the motor shaft of the pitch motor 32 drives the camera 5 to rotate about the pitch axis, the limiting shaft 34 can provide support for the rotation of the camera 5 to improve the stability of the rotation of the camera 5.

Figure 4:
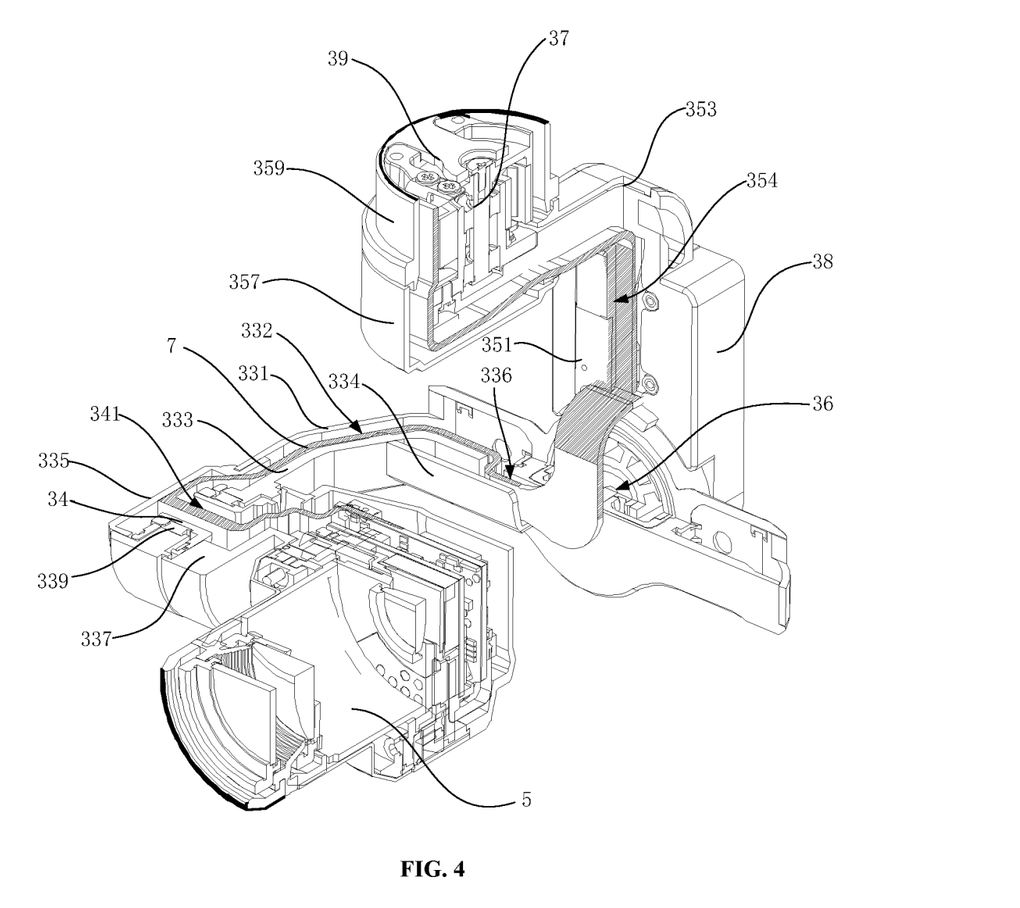
FIG. 4 is a partial cross-sectional view of FIG. 2, where the coaxial cable has been deformed to illustrate its direction more intuitively.
Figure 5:
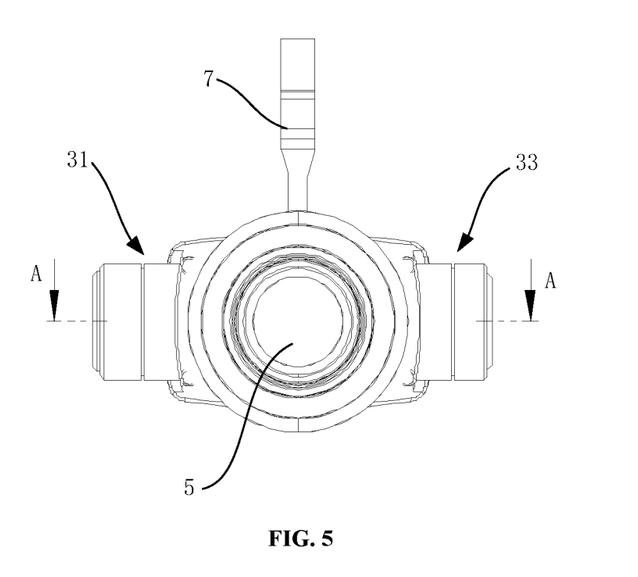
FIG. 5 is a front view of FIG. 3, where the upper arm and its upper part are omitted and only the coaxial cable is exposed.
Figure 6:
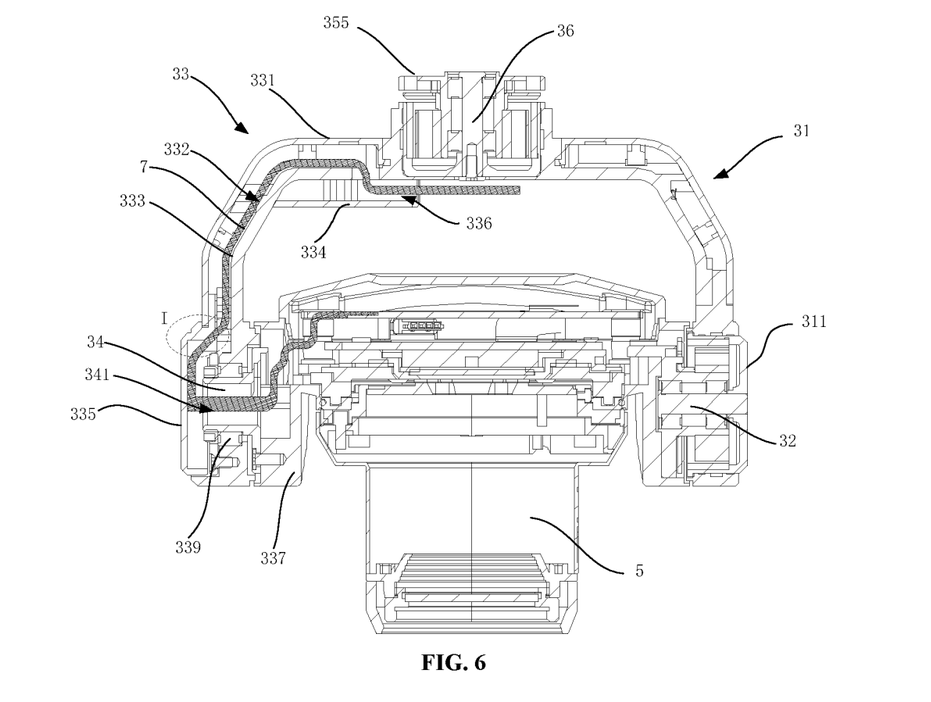
FIG. 6 is a cross-sectional view along a line A-A in FIG. 5.

FIG. 4 is a partial cross-sectional view of FIG. 2, FIG. 5 is a front view of FIG. 3, and FIG. 6 is a partial cross-sectional view along a line A-A in FIG. 5. As shown in FIGS. 4-6, a first wiring space 341 is formed in the limiting shaft 34, and a second wiring space 332 in connection with the first wiring space 341 is formed in the left support arm 33. A first end of the coaxial cable 7 (hereinafter referred to as a lower end) enters into the second wiring space 332 from outside the left support arm 33, and passes through the second wiring space 332 and the first wiring space 341 in sequence, then passes through the limiting shaft 34 to be electrically connected to the camera 5. A second end of the coaxial cable 7 (hereinafter referred to as an upper end) is electrically connected to the flight control system in the center frame 11.

More specifically, the left support arm 33 may include a first housing and a second housing covering each other to the second housing to enclose the second wiring space 332. In a specific design, the left support arm 33 may be designed as an upper housing and a lower housing covering each other, or the left support arm 33 may be designed as a left housing 331 and a right housing 333 covering each other. It should be understood that in this embodiment, the left housing 331 or the right housing 333 may include all side walls, or the left housing 331 and the right housing 333 may each include a part of the side wall. By designing the left support arm 33 as the first housing connected the second housing, the manufacturing process is simply. For example, the left housing 331 and the right housing 333 may be made directly by molding or pressing. However, it should be noted that the left support arm 33 in this embodiment does not exclude the way in which the second wiring space 332 can be formed by opening holes or slots in the left support arm 33.

The limiting shaft 34 may be a hollow shaft with openings at both ends, such that the hollow space in the hollow shaft can be used as the first wiring space 341. More specifically, the openings of the hollow shaft can be placed on the end surfaces of the two ends or on the side surfaces of the two ends, and those skilled in the art can configure it based on actual needs. During assembly, one end of the hollow shaft (the left end in FIG. 4) may be accommodated in the second wiring space 332 of the left support arm 33 to realize the communication between the first wiring space 341 and the second wiring space 332. The other end of the hollow shaft (the right end in FIG. 4) may extend from the left support arm 33, and extend toward the right support arm 31, such that the coaxial cable 7 passing through the hollow space of the hollow shaft (i.e., the first wiring space 341) can be positioned outside the left support arm 33 for electrical connection with the camera 5.

Figure 7:
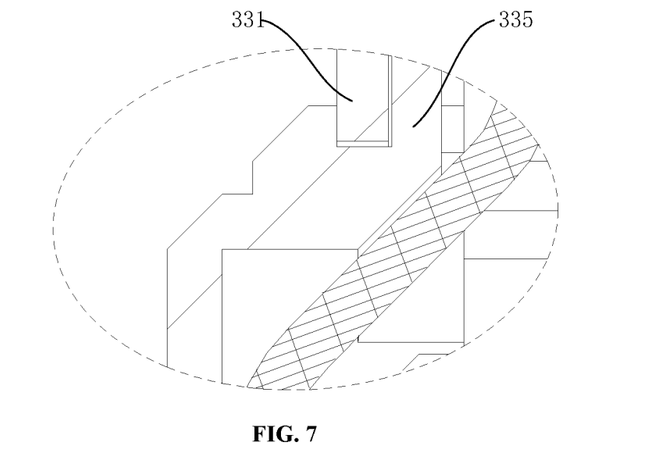
FIG. 7 is a partially enlarged view of position I in FIG. 6.

In this embodiment, in order to mount the limiting shaft 34, a mounting hole may be placed at the front end of the left support arm 33 near the side of the right support arm 31 (i.e., the right side), and a bearing 339 for supporting the hollow shaft may be mounted in the mounting hole. In some embodiments, in order to better support the hollow shaft, a support part 337 may be formed on the right side of the left support arm 33 close to the right support arm 31. A through hole may be disposed on the support part 337 such that the right end of the hollow shaft may pass through. In addition, for example, in order to facilitate the mounting of the limiting shaft 34 and the bearing 339 for supporting the limiting shaft 34, a dust cover 335 may also be disposed on the side of the left support arm 33 away from the right support arm 31, which can cover the left end of the hollow shaft. The dust cover 335 can form a labyrinth seal structure with the left support arm 33 as shown in FIG. 7. FIG. 7 is a partially enlarged view of position I in FIG. 6.

Similarly, the right support arm 31 may include an upper housing and a lower housing covering each other, or a left housing 331 and a right housing 333 covering each other. In order to mount the pitch motor 32 at the front end of the right support arm 31, in this embodiment, a first mounting hole may be placed at the front end of the right support arm 31. The pitch motor 32 may be fixed in the first mounting hole directly or through a motor base, and the motor shaft of the pitch motor 32 may pass through a motor shaft hole on the left side of the front end of the right support arm 31 and extend toward the left support arm 33. In order to prevent dust, rain, or snow from entering the right support arm 31, a first motor cover 311 may also be used to cover the outside of the first mounting hole. Of course, in some embodiments, the pitch motor 32 may be directly mounted in the enclosed space formed in the right support arm 31, such that there is no need to provide the first motor cover 311 at this time.

The following example illustrate how the coaxial cable 7 can be used to connect the flight control system and the camera 5 is laid in the gimbal 3 in this embodiment.

In one case, when the gimbal 3 is a single-axis gimbal 3 that can only rotate about the pitch axis, the upper end of the coaxial cable 7 may be electrically connected to an interface disposed on the center frame 11. The interface may be disposed at a position where the gimbal 3 and the center frame 11 are connected. The lower end of the coaxial cable 7 may pass through the second wiring space 332 in the left support arm 33 from a wiring hole placed on the left support arm 33, then pass through the first wiring space 341 in the limiting shaft 34 from a wiring hole placed on the limiting shaft 34, and pass through the limiting shaft 34 from another wiring hole placed on the limiting shaft 34. It should be understood that the other wiring hole of the limiting shaft 34 may be placed on the part of the limiting shaft 34 positioned outside the left support arm 33.

Generally, in this embodiment, the wiring hole placed on the left support arm 33 of the single-axis gimbal 3 may be positioned at the connection position of the left support arm 33 and the center frame 11. As such, the possibility of dust, rain, or snow entering the left support arm 33 may be reduced, thereby improving the dustproof and moisture-proof effect of the gimbal 3 and improving the working stability and service life of the gimbal 3. It should be understood that if the single-axis gimbal 3 includes the upper support arm 35 connected to the rear end of the left support arm 33, for the considerations of dustproofing and moisture-proofing, a part of the second wiring space 332 may be formed in the left support arm 33 and another part of the second wiring space 332 may be formed in the upper support arm 35 to reduce the possibility of the coaxial cable 7 being exposed to the external environment, thereby improving the dustproofing and moisture-proofing capabilities of the single-axis gimbal 3.

In another case, when the gimbal 3 is a dual-axis or three-axis gimbal 3 that can rotate about the roll axis, the coaxial cable 7 may need to pass through the left support arm 33 and bypass the roll motor 36. At this time, an additional structure may be needed to reduce the part of the coaxial cable 7 being exposed to the external environment to improve the dustproofing and moisture-proofing capabilities of the gimbal 3. In order to describe the additional structure for reducing the exposure of the coaxial cable 7 more clearly, the following will take the three-axis gimbal 3 as an example for description. The dual-axis gimbal 3 or other similar structures including the pitch axis and the roll axis can be adjusted adaptively with reference to the following structure, but those skilled in the art should understand that these adaptive adjustments still fall within the protection scope of the appended claims.

Figure 8:
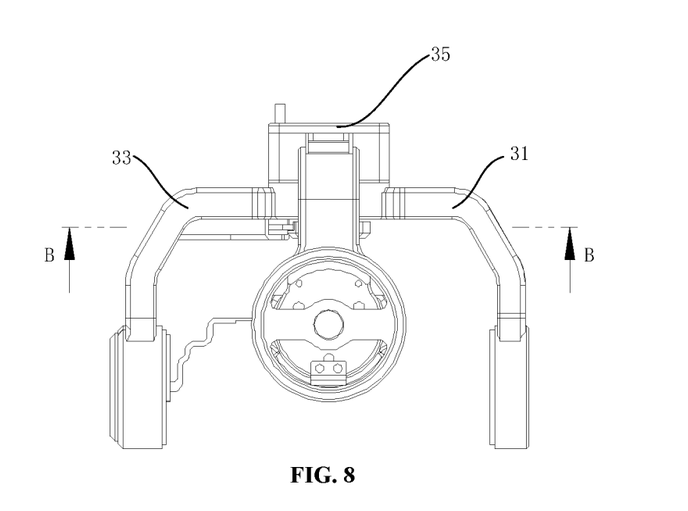
FIG. 8 is a top view of FIG. 2 with the camera removed.
Figure 9:
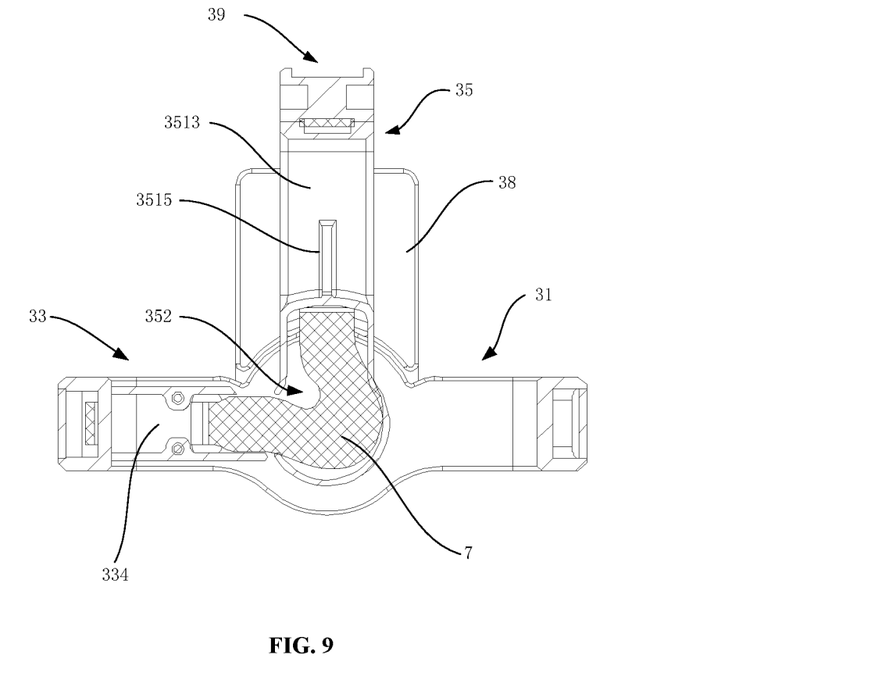
FIG. 9 is a cross-sectional view along a line B-B in FIG. 8.
Figure 10:
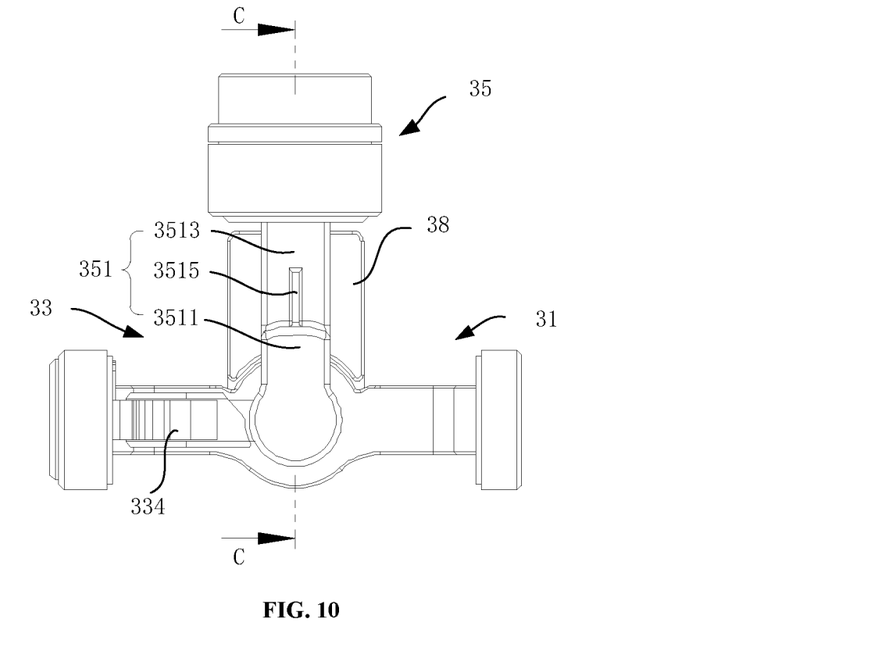
FIG. 10 is a front view of FIG. 2 with the camera removed.
Figure 11:
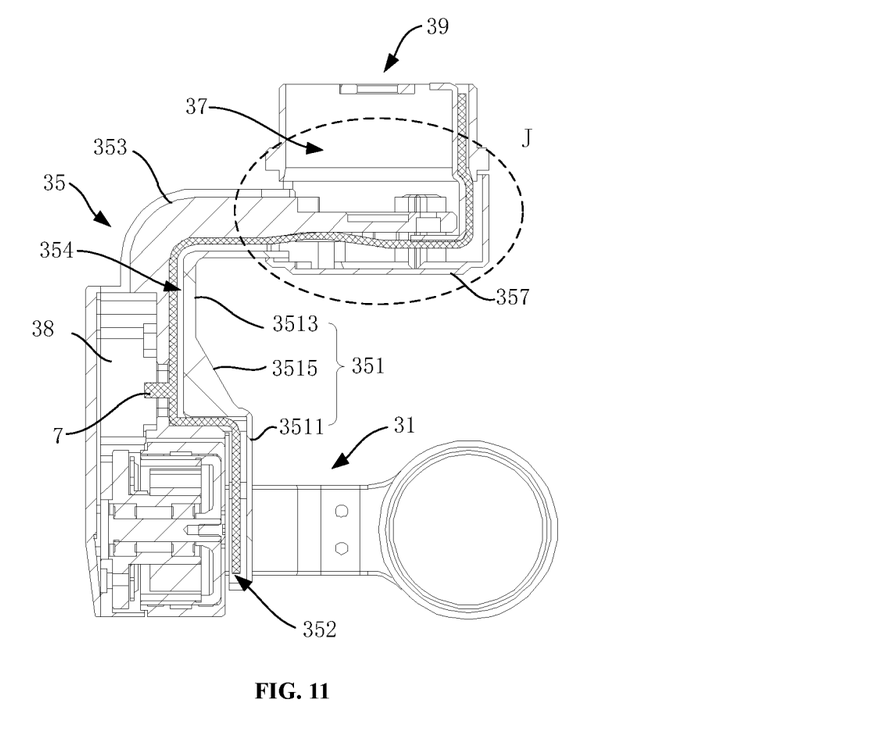
FIG. 11 is a cross-sectional view along a line C-C in FIG. 10.

FIG. 8 is a top view of FIG. 2 with the camera 5 removed, FIG. 9 is a cross-sectional view along a line B-B in FIG. 8, FIG. 10 is a front view of FIG. 2 with the camera 5 removed, and FIG. 11 is a cross-sectional view along a line C-C in FIG. 10

Referring to FIGS. 4 to 11. A second mounting hole is formed at the bottom of the upper support arm 35, and the roll motor 36 is mounted in the second mounting hole directly or through a motor base, such that the stator of the roll motor 36 and the bottom of the upper support arm 35 are fixed together. A second motor cover 355 can cover the outside of the second mounting hole to ensure the airtightness of the upper support arm 35 and prevent dust, rain, or snow from entering the upper support arm 35, thereby ensuring the normal operation of the roll motor 35 and increasing the service life of the gimbal 3. Of course, similar to the right support arm 31, the second mounting hole may not be disposed at the bottom of the upper support arm 35. Instead, the roll motor 36 may be directly mounted in the enclosed space formed by the upper support arm 35.

The rotor (e.g., a motor shaft) of the roll motor 36 may pass through the shaft hole at the front end of the upper support arm 35 and fixedly connect to the rear ends of the left support arm 33 and the right support arm 31. As such, when the rotor of the roll motor 36 rotates, the left support arm 33 and the right support arm 31 can be driven to rotate synchronously to adjust the rolling angle of the camera 5 detachably connected to the left support arm 33 and the right support arm 31. In order to cover the rotor of the roll motor 36 and avoid damage, in this embodiment, the left support arm 33 and the right support arm 31 may be formed as an integral structure (e.g., it can be referred to as a front arm assembly), such that the rotor of the roll motor 36 can be inserted and contained in the front arm assembly.

Still referring to FIGS. 4 to 11. In order to avoid the roll motor 36, a decorative cover 334 may also be disposed on the 0.33, and the decorative cover 334 and the rear end of the left support arm 33 may enclose a third wiring space 336. A wiring hole may be disposed on the part of the left support arm 33 positioned in the third wiring space 336. As such, the upper end of the coaxial cable 7 extending to the flight control system may pass through the second wiring space 332 from the wiring hole, and then be laid in the third wiring space 336. It should be understood that the third wiring space 336 may be positioned above, below, in front of, and behind a bending part of the left support arm 33 bent toward the right support arm 31. However, considering the visual aesthetics and cleanliness of the appearance, in this embodiment, the third wiring space 336 may be disposed in front of the bending part. Therefore, when the camera 5 is being carried by the gimbal 3, the decorative cover 334 will be positioned exactly between the camera 5 and the left support arm 33, which is not easily seen from the outside. As such, the aesthetics and cleanliness of the overall appearance of the gimbal can be improved.

Referring to FIGS. 4, and 8-11, in order to cooperate with the third wiring space 336 to further reduce the possibility of exposing the coaxial cable 7 during wiring, a shielding part 3511 may be formed on the upper support arm 35. The shielding part 3511 may be wound around a part of the outer side of the roll motor 36, such that a fourth wiring space 352 may be formed with the rear end of the second support arm. The fourth wiring space 352 may be connected to the third wiring space 336, such that the upper end of the coaxial cable 7 extending toward the flight control system can enter the fourth wiring space 352 after passing through the third wiring space 336. As such, the coaxial cable 7 may not be exposed to the external environment. More specifically, a part of the shielding part 3511 may cover a part of the decorative cover 334, or a part of the decorative cover 334 may cover a part of the shielding part 3511. As such, the third wiring space 336 and the 352 may be connected.

After the coaxial cable 7 passes through the fourth wiring space 352 toward the upper end of the flight control system, the coaxial cable 7 may enter into a fifth wiring space 354 formed by the third support arm from the wiring hole placed in the part of the third support arm positioned in the fourth wiring space 352.

In this embodiment, the shielding part 3511 may be set based on actual needs. For example, as shown in FIGS. 2 and 11, the shielding part 3511 includes a first section and a second section. The first section is positioned above the rear end of the left support arm 33, the second section is position in front of the rear end of the left support arm 33, and the top surface of the second section is connected to the front of the first section. Of course, the shielding part 3511 may also include other structures. For example, the shielding part 3511 may extend diagonally downward from the other part of the upper support arm 35 to the front of the rear end of the left support arm 33. Sill referring to FIGS. 2 and 11, in some embodiments, a reinforcing rib 3515 is disposed between the first section and other parts of the upper support arm 35, and two ends of the reinforcing rib 3515 are respectively fixed to the first section and other parts of the upper support arm 35.

In addition, in this embodiment, the upper support arm 35 may use any suitable structure, for example, a rod-shaped or frame-shaped component of an integral structure may be selected as the upper support arm 35. Alternatively, as shown in FIGS. 2, 4, and 8-11, the upper support arm 35 includes a first cover plate 351 and a second cover plate 353 covering each other. An upper part 3513 of the first cover plate 351 and the second cover plate 353 enclose the fifth wiring space 354, and a lower part of the first cover plate 351 forms the shielding part 3511 in order to form the fourth wiring space 352 with the rear end of the left support arm 33. More specifically, the upper part 3513 of the first cover plate 351 is arranged in parallel with the second cover plate 353, and its lower part is first bent forward to wrap around from the rear of the rear end of the left support arm 33 to the front, and further extends downward to cover a part of the decorative cover 334 mounted on the inside of the rear end of the left support arm 33.

Further, still referring to FIGS. 2, 4, 9, and 11, the battery 38 may be optionally attached to the middle of the third support arm. The coaxial cable 7 passing through the fifth wiring space 354 is electrically connected to the battery 38 to supply power to the motors of the three-axis gimbal 3. Of course, the battery 38 may also be used to supply power to one or more of the camera 5, the flight control system, and the power assembly 15 mounted on the gimbal 3.

In addition, as shown in FIGS. 2, 4, 9, and 11, the top of the upper support arm 35 is bent forward to form a mounting part for mounting the yaw motor 37. More specifically, a third mounting hole is placed on the mounting part, and the yaw motor 37 is fixed in the third mounting hole directly or through a motor mounting seat. That is, the third mounting hole is placed on the first cover plate 351, the top of the yaw motor 37 passes through the third mounting hole positioned below the first cover plate 351, and the motor shaft of the yaw motor 27 passes through the shaft hole placed on the second cover plate 353 and is then fixed in the fifth wiring space 354 formed by the first cover plate 351 and the second cover plate 353. A third motor cover 357 may be disposed on the outside of the third mounting hole. A gap may be reserved between the third motor cover 357 and the bottom of the yaw motor 37 for the coaxial cable 7 to pass through, such that the top of the coaxial cable 7 may not need to pass through the fifth wiring space 354, but may directly connect to the flight control system after passing through the gap. By reserving the gap between the bottom of the yaw motor 37 and the third motor cover 357, the sealing performance of the gimbal can be improved, and the dustproof and waterproof effect can be ensured.

Figure 12:
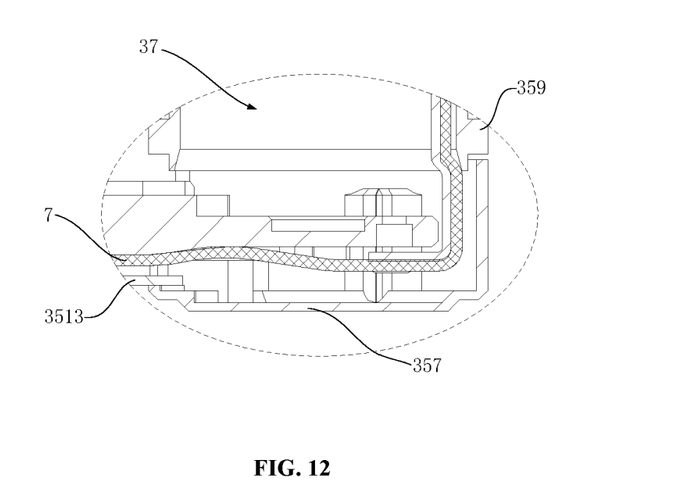
FIG. 12 is a partially enlarged view of position J in FIG. 11.

FIG. 12 is a partially enlarged view of position J in FIG. 11. As shown in FIG. 12, the third motor cover 357 may be disposed with one or more of the first cover plate 351 and second cover plate 353, thereby forming a staggered structure to improve the tightness of the gimbal 3.

Referring to FIG. 4, a quick release connector 39 for detachably connecting the gimbal 3 and the center frame 11 is disposed at the top of the mounting part. For example, the quick release connector 39 may be disposed at the position of the shaft hole of the second cover plate 353 through which the motor shaft of the yaw motor 37 can pass through. Of course, the quick release connector 39 may also be disposed at other positions of the second cover plate 353.

In addition, a microcontroller unit (MCU) may be disposed between the quick release connector 39 and the upper support arm 35. The MCU may be electrically connected to the flight control system through the quick release connector 39, and the top end of the coaxial cable 7 passing through the gimbal 3 may be electrically connected to the MCU. In some embodiments, in order to protect the MCU, a protective cover 359 may be disposed above the second cover plate 353 shown in FIG. 4. The protective cover and the third motor cover 357 may be set up together to form a staggered structure to avoid the entry of dust, rain, or snow, thereby ensuring the normal operation of the MCU and the yaw motor 37.

In addition, in the above embodiment, one or more of the first wiring space 341, second wiring space 332, and the fifth wiring space 354 may be formed with a slot for holding the coaxial cable 7. Taking the second wiring space 332 as an example, when the left housing 331 and the right housing 333 are covered together, the partition on the left housing 331 and the corresponding partition on the right housing 333 may form a circular hole or an oval hole to hold the coaxial cable 7. During assembly, the coaxial cable 7 may be laid on the partition of the left housing 331 or the right housing 333, then the left housing 331 and the right housing 333 may be covered together, such that the coaxial cable 7 can be easily held in place.

In this embodiment, by using two support arms to realize the detachable connection with the imaging device, and forming the second wiring space and the first wiring space by using the second support arm without the pitch motor and the limiting shaft disposed at the front end of the second support arm, the stability of the imaging device can be improved when it rotates. Further, since the coaxial cable has a small area and higher strength and flexibility than the FPC cable used by conventional gimbal, the coaxial cable can pass through the second wiring space directly through the first wiring space in the limiting shaft. Therefore, there is no need to punch holes on the side of the gimbal to make the FPC cable to bypass the limiting shaft. This can not only ensure the aesthetics and cleanliness of the appearance of the gimbal, but also reduce the possibility of dust, rain, or snow from entering the gimbal, thereby improving the stability and service life of the gimbal.

Finally, although the advantages associated with certain embodiments of the technology have been described in the context of these embodiments, other embodiments may also include such advantages, and not all the advantages of the disclosure are described in all the embodiments. The advantages objectively brought by the technical features in the embodiments should be regarded as the advantages of the present disclosure that are different from the existing technologies, and all belong to the scope of the present disclosure.

What is claimed is:

1. A gimbal, comprising:
a pitch motor;
a coaxial cable;
a first support arm arranged opposite a second support arm; and
a third support arm connecting to a rear end of the first support arm and a rear end of the second support arm, the third support arm being inclined to the first support arm and the second support arm;
wherein:
the pitch motor is disposed at a front end of the first support arm, a motor shaft of the pitch motor extending in a direction of the second support arm for detachably connecting with one end of an imaging device;
a limiting shaft is disposed at a front end of the second support arm, the limiting shaft extending in a direction of the first arm for detachably connecting with another end of the imaging device; and
a first wiring space is formed in the limiting shaft and a second wiring space connected to the first wiring space is formed in the second support arm, a first end of the coaxial cable sequentially passing through the second wiring space and the first wiring space for electrically connecting with the imaging device;
a decorative cover is disposed on the second support arm, the decorative cover and the rear end of the second support arm enclosing a third wiring space;
a shielding part is formed on the third support arm, the shielding part and the rear end of the second support arm enclosing a fourth wiring space connected to the third wiring space; and
a fifth wiring space connecting to the fourth wiring space is formed on the third support arm.

2. The gimbal of claim 1, wherein:
the second support arm includes a first housing and a second housing covering the first housing, and the first housing and the second housing enclose the second wiring space.

3. The gimbal of claim 1, wherein:
the limiting shaft is a hollow shaft with openings at both ends, one end of the hollow shaft is accommodated in the second wiring space, the other end of the hollow shaft extends toward the second support arm, and the hollow space in the hollow shaft is the first wiring space.

4. The gimbal of claim 3, further comprising:
a support part formed on the front end of the second support arm on a side facing the first support arm, and a through hole formed by the support part for the hollow shaft to pass through.

5. The gimbal of claim 3, wherein:
a dust cover covering the hollow shaft being disposed at a side of the front end of the second support arm away from the first support arm, wherein the dust cover and the second support arm form a sealing structure.

6. The gimbal of claim 1, wherein:
the first support arm and the second support arm are an integral piece.

7. The gimbal of claim 1, further comprising:
a first mounting hole formed at the front end of the first support arm, the pitch motor being mounted in the first mounting hole, and the first mounting hole being covered with a first motor cover.

8. The gimbal of claim 7, further comprising:
a roll motor, wherein
the rear end of the first support arm and the rear end of the second support arm are fixed to a rotor of the roll motor, and a bottom end of the third support arm is fixed to a stator of the roll motor.

9. The gimbal of claim 8, wherein:
after a second end of the coaxial cable passes through the second wiring space, the second end of the coaxial cable passes through the third wiring space and the fourth wiring space in sequence, and enters into the fifth wiring space.

10. The gimbal of claim 1, wherein:
the shielding part includes a first section and a second section connected to the first section, the first section being positioned above the rear end of the second support arm, and the second section being positioned in front of the rear end of the second support arm.

11. The gimbal of claim 10, wherein:
the shielding part further includes a reinforcing rib, both ends of the reinforcing rib being respectively fixed to the first section and other parts of the third support arm.

12. The gimbal of claim 1, wherein:
the third support arm includes a first cover plate and a second cover plate covering each other, the first cover plate and the second cover plate enclosing the fifth wiring space, and the shielding part being a part of the first cover plate.

13. The gimbal of claim 1, wherein:
a slot is formed in one or more of the first wiring space, the second wiring space, and the fifth wiring space for holding the coaxial cable.

14. The gimbal of claim 1, wherein:
a battery is disposed in a middle section of the third support arm, and the coaxial cable passing through the fifth wiring space is electrically connected to the battery.

15. The gimbal of claim 8, wherein:
a second mounting hole is formed at the bottom end of the third support arm, the roll motor is disposed in the second mounting hole, and the second mounting hole is covered with a second motor cover.

16. The gimbal of claim 1, wherein:
the third support arm is perpendicular to the first support arm and the second support arm.

17. The gimbal of claim 1, further comprising:
a yaw motor mounted on top of the third support arm, where the second end of the coaxial cable passes through a gap between the yaw motor and the third support arm.

18. An unmanned aerial vehicle (UAV) frame, comprising:
a center frame; and
a gimbal including:
a pitch motor;
a coaxial cable; and
a first support arm arranged opposite a second support arm; and
a third support arm connecting to a rear end of the first support arm and a rear end of the second support arm, the third support arm being inclined to the first support arm and the second support arm;
wherein:
the pitch motor is disposed at a front end of the first support arm, a motor shaft of the pitch motor extending in a direction of the second support arm for detachably connecting with one end of an imaging device;
a limiting shaft is disposed at a front end of the second support arm, the limiting shaft extending in a direction of the first arm for detachably connecting with another end of the imaging device;
a first wiring space is formed in the limiting shaft and a second wiring space connected to the first wiring space is formed in the second support arm, a first end of the coaxial cable sequentially passing through the second wiring space and the first wiring space for electrically connecting with the imaging device;
a rear end of the first support arm and a rear end of the second support arm are rotatably connected below the center frame;
a decorative cover is disposed on the second support arm, the decorative cover and the rear end of the second support arm enclosing a third wiring space;
a shielding part is formed on the third support arm, the shielding part and the rear end of the second support arm enclosing a fourth wiring space connected to the third wiring space; and
a fifth wiring space connecting to the fourth wiring space is formed on the third support arm.

19. An unmanned aerial vehicle (UAV), comprising:
a frame including a center frame and a gimbal;
an arm;
a power assembly being connected to the center frame of the frame through the arm;
the gimbal including:
a pitch motor;
a coaxial cable; and
a first support arm arranged opposite a second support arm; and
a third support arm connecting to a rear end of the first support arm and a rear end of the second support arm, the third support arm being inclined to the first support arm and the second support arm;
wherein:
the pitch motor is disposed at a front end of the first support arm, a motor shaft of the pitch motor extending in a direction of the second support arm for detachably connecting with one end of an imaging device;
a limiting shaft is disposed at a front end of the second support arm, the limiting shaft extending in a direction of the first arm for detachably connecting with another end of the imaging device;
a first wiring space is formed in the limiting shaft and a second wiring space connected to the first wiring space is formed in the second support arm, a first end of the coaxial cable sequentially passing through the second wiring space and the first wiring space for electrically connecting with the imaging device;
a rear end of the first support arm and a rear end of the second support arm are rotatably connected below the center frame;
a decorative cover is disposed on the second support arm, the decorative cover and the rear end of the second support arm enclosing a third wiring space;
a shielding part is formed on the third support arm, the shielding part and the rear end of the second support arm enclosing a fourth wiring space connected to the third wiring space; and
a fifth wiring space connecting to the fourth wiring space is formed on the third support arm.

* * * * *